United States Patent
Akashi

(10) Patent No.: US 6,810,327 B2
(45) Date of Patent: Oct. 26, 2004

(54) NAVIGATION APPARATUS, MAP INFORMATION STORAGE MEDIUM, AND METHOD OF PROVIDING INFORMATION ABOUT AREA LYING BEYOND INTERSECTION

(75) Inventor: Yoshiki Akashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/336,515

(22) Filed: Jan. 6, 2003

(65) Prior Publication Data

US 2003/0130788 A1 Jul. 10, 2003

(30) Foreign Application Priority Data

Jan. 10, 2002 (JP) ........................................ 2002-003791

(51) Int. Cl.$^7$ .............................................. G01C 21/26
(52) U.S. Cl. ........................ 701/209; 701/210; 701/211; 701/213
(58) Field of Search ................................ 701/200–213, 701/24, 36; 340/990, 995; 345/684, 472

(56) References Cited

U.S. PATENT DOCUMENTS

| | | | | |
|---|---|---|---|---|
| 6,640,185 B2 | * | 10/2003 | Yokota et al. | 701/208 |
| 6,640,187 B1 | * | 10/2003 | Chenault et al. | 701/209 |
| 6,643,584 B1 | * | 11/2003 | Ikeuchi et al. | 701/209 |
| 6,662,101 B2 | * | 12/2003 | Adachi | 701/201 |
| 6,665,610 B1 | * | 12/2003 | Correia et al. | 701/209 |
| 6,678,610 B2 | * | 1/2004 | Delling et al. | 701/208 |
| 6,687,613 B2 | * | 2/2004 | Yokota | 701/209 |
| 6,691,028 B2 | * | 2/2004 | Bullock et al. | 701/202 |
| 6,693,564 B2 | * | 2/2004 | Niitsuma | 340/995.2 |

FOREIGN PATENT DOCUMENTS

JP  2924885 B2  5/1997

* cited by examiner

Primary Examiner—Richard M. Camby
(74) Attorney, Agent, or Firm—Birch, Stewart, Kolasch & Birch, LLP

(57) ABSTRACT

A navigation apparatus includes a route searching unit for searching for a route from a current position of a moving object to a destination or via point based on map information, an intersection extraction unit for extracting information about an intersection that is located forward of the moving object along the route and that is a target for guidance from the map information, an area information extraction unit for extracting plural pieces of area information about areas lying along the route and beyond the intersection from the map information, a comparison unit for comparing specific information included in each piece of area information with information about the destination or via point, and a selection unit for selecting one piece of area information that is to be a target for guidance based on comparison results obtained by the comparison unit among from the plural pieces of area information.

16 Claims, 7 Drawing Sheets

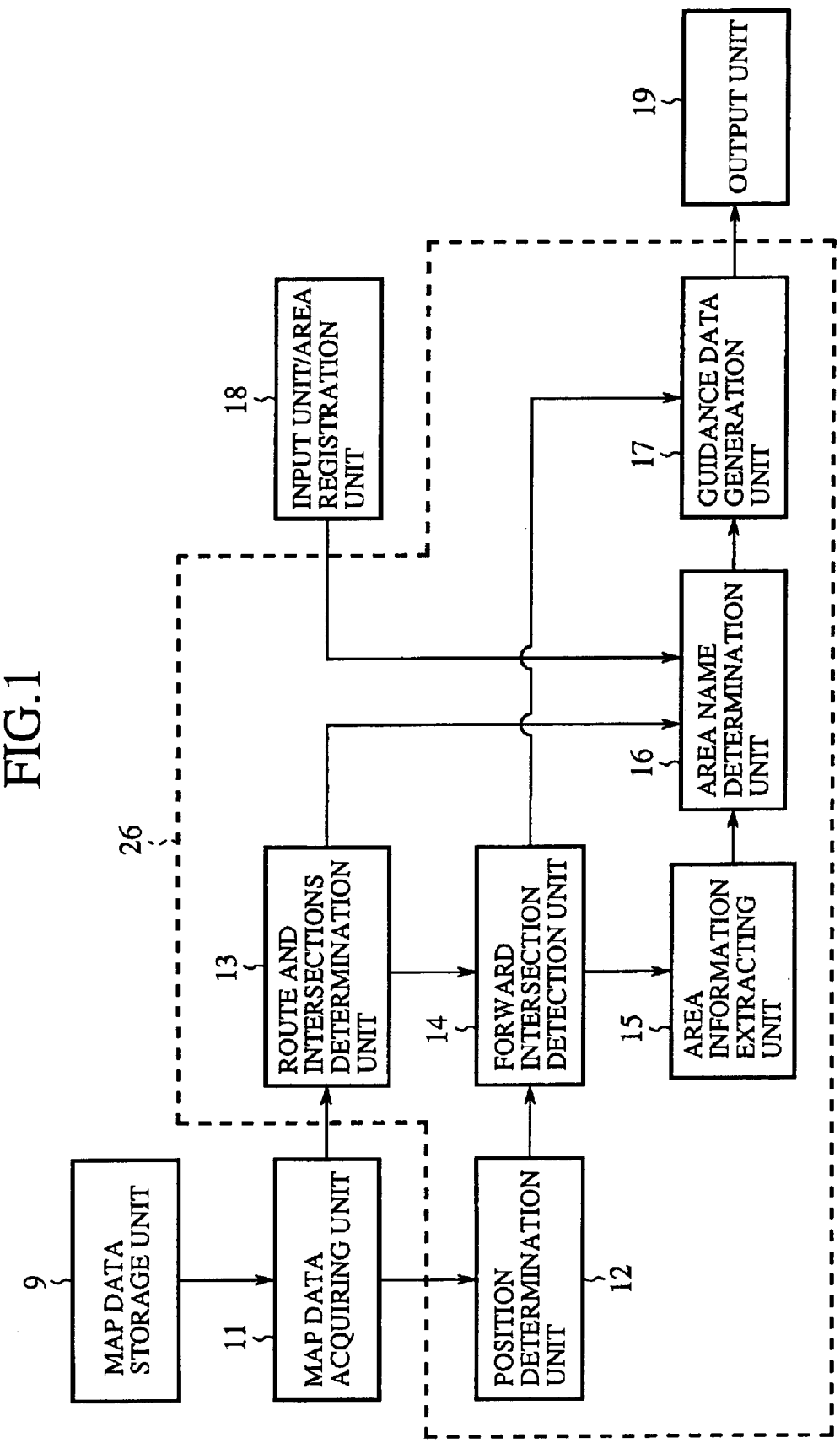

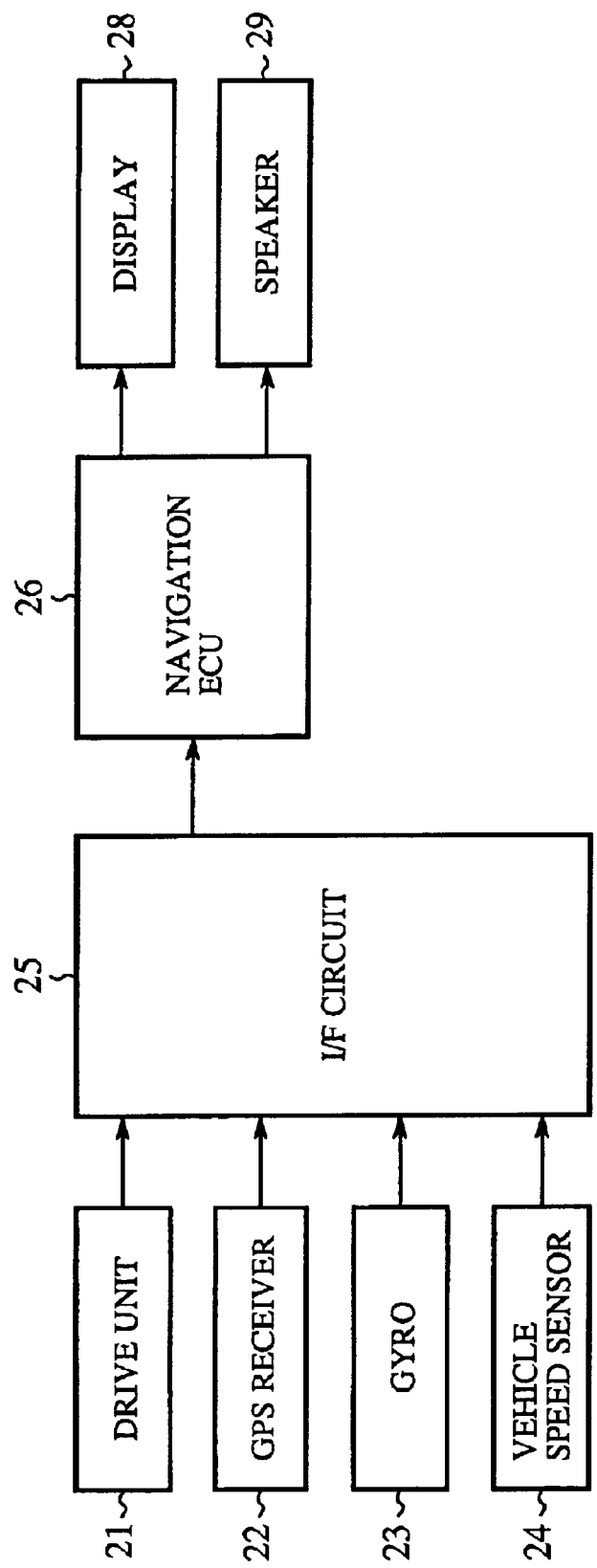

FIG.3

GUIDANCE DATA ON EACH INTERSECTION

| | NUMBER OF ROADS OUTGOING FROM EACH INTERSECTION (m) |
|---|---|
| 1 | ADDRESS AND SIZE OF DATA ON AREAS LYING ALONG A FIRST ROAD |
| | . . . |
| m | ADDRESS AND SIZE OF DATA ON AREAS LYING ALONG AN m-th ROAD |

DATA ON AREAS LYING ALONG THE FIRST ROAD

| | NUMBER OF AREAS LYING ALONG THE FIRST ROAD (k) |
|---|---|
| 1 | ADDRESS AND SIZE OF CHARACTER STRING DATA |
| | ADDRESS AND SIZE OF VOICE DATA |
| | LATITUDE AND LONGITUDE |
| | DISTANCE FROM EACH INTERSECTION TO A TYPICAL POINT OF A FIRST AREA LYING ALONG THE FIRST ROAD |
| | DISTANCE LEVEL |
| | . . . |
| k | ADDRESS AND SIZE OF CHARACTER STRING DATA |
| | ADDRESS AND SIZE OF VOICE DATA |
| | LATITUDE AND LONGITUDE |
| | DISTANCE FROM EACH INTERSECTION TO A TYPICAL POINT OF A K-TH AREA LYING ALONG THE FIRST ROAD |
| | DISTANCE LEVEL |

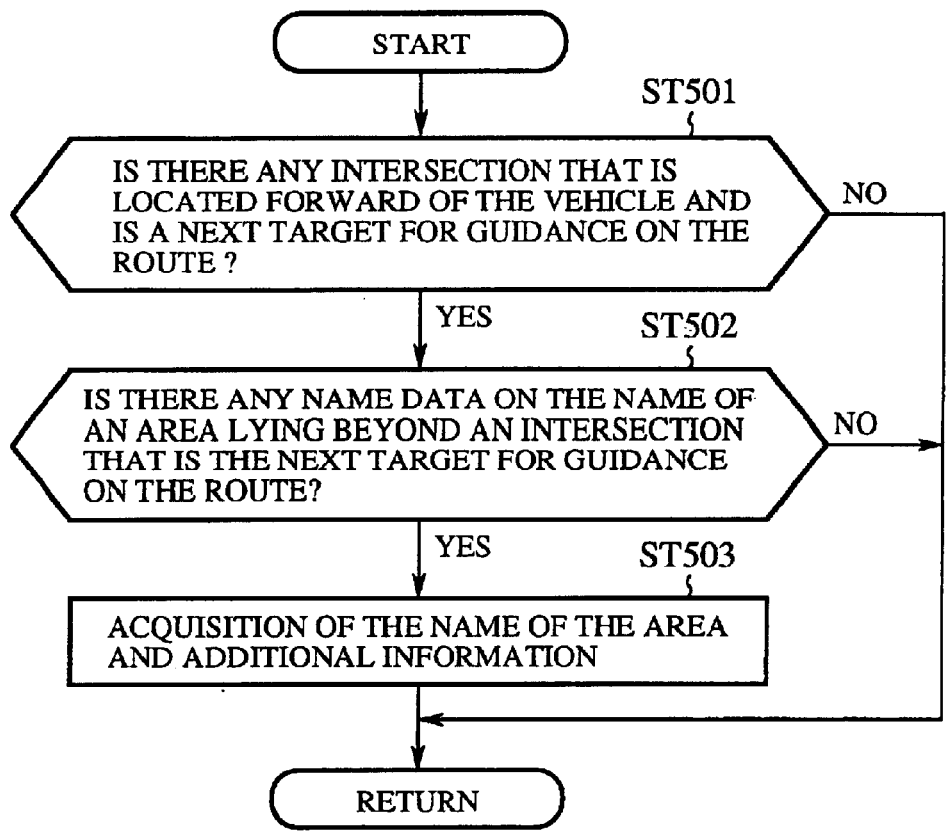
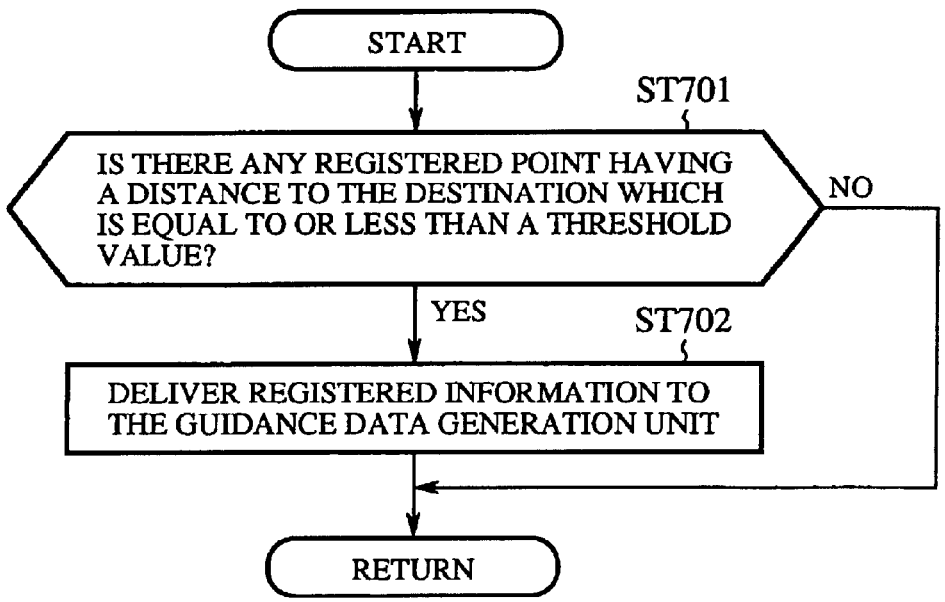

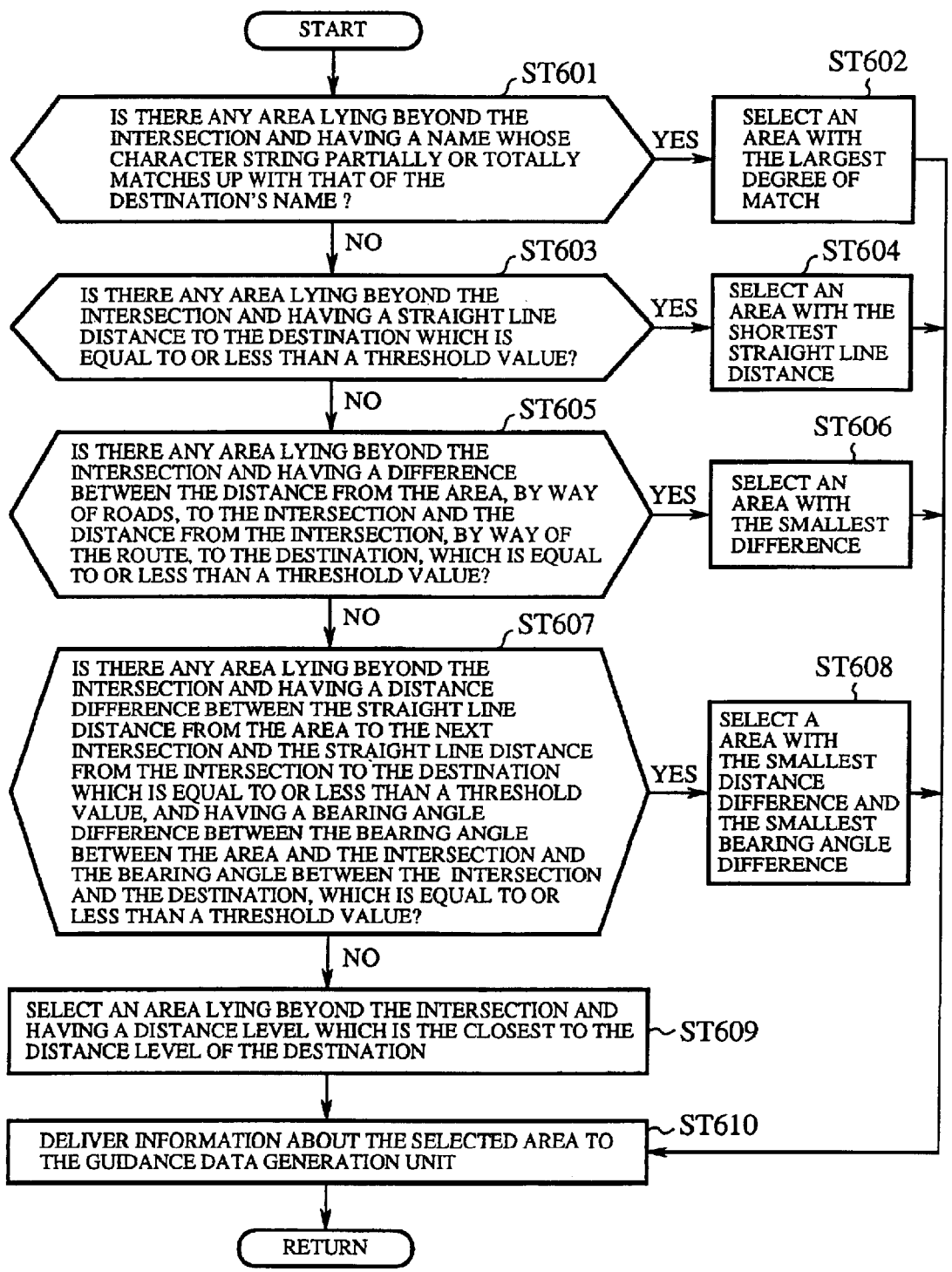

| NAME OF AREA LYING BEYOND THE INTERSECTION | LATITUDE AND LONGITUDE | STRAIGHT LINE DISTANCE FROM THE INTERSECTION | DISTANCE LEVEL (N=3) |
|---|---|---|---|
| A | (35° 29', 135° 30') | 200 Km | 3 |
| B | (34° 90', 136° 40') | 80 Km | 2 |
| C | (34° 49', 137° 10') | 10 Km | 1 |

NAVIGATION APPARATUS, MAP INFORMATION STORAGE MEDIUM, AND METHOD OF PROVIDING INFORMATION ABOUT AREA LYING BEYOND INTERSECTION

BACKGROUND OF THE INVENTION

1. Field of the Invention

The present invention relates to a navigation apparatus that can provide guidance on branches more properly when a moving object, such as a vehicle, equipped with the navigation apparatus reaches an intersection, a map information storage medium which the navigation apparatus employs, and a method of providing information about areas lying beyond a certain intersection for users more properly.

2. Description of Related Art

A prior art navigation apparatus intended for vehicles as disclosed in Japanese Patent No. 2,924,885 stores the names of a plurality of areas lying along each road outgoing from each intersection to which a vehicle equipped with the navigation apparatus can be headed. Only when there are two consecutive branch points (first and second branch points) that have to be targets for guidance and they are associated with the same name of an area lying beyond the two branch points, the navigation apparatus selects and displays, as a target area lying beyond the first branch point, an area lying beyond the first branch point having the same name as one of areas lying beyond the second branch point.

A problem with such a prior art navigation apparatus constructed as mentioned above is that when a vehicle equipped with the navigation apparatus approaches a place where no consecutive branch points exist, the navigation apparatus selects one of areas lying around the place for guidance without reference to any rules, or provides guidance on all areas lying around the place regardless of a destination set by users, and therefore the navigation apparatus cannot provide guidance on the name of a necessary area lying around the place for users or provides guidance on the name of an unnecessary area lying around the place for users, so that it is difficult for users to select necessary information.

SUMMARY OF THE INVENTION

The present invention is proposed to solve the above-mentioned problem, and it is therefore an object of the present invention to provide a navigation apparatus that can select an on-target area lying beyond a certain intersection or a certain branch point and can provide the name of the selected area for guidance, a map affection storage medium which the navigation apparatus employs, and an area information providing method capable of providing information about an on-target area lying beyond a certain intersection or a certain branch point for users.

In accordance with an aspect of the present invention, there is provided a navigation apparatus including a route searching unit for searching for a route from a current position of a moving object to a destination or via point set by an input unit based on map information acquired by a map information acquiring unit, an intersection extraction unit for extracting information about an intersection that is located forward of the moving object along the route and that is a target for guidance from the acquired map information, an area information extraction unit for extracting one or more pieces of area information about one or more areas lying along the route and beyond the intersection from the acquired map information, a comparison unit for comparing specific information included in each of the one or more pieces of area information with either destination information about the destination or via point information about the via point, a selection unit for selecting one piece of area information that is to be a target for guidance based on comparison results obtained by the comparison unit among from the one or more pieces of area information, and an output unit for outputting the selected area information.

As a result, the present invention provides an advantage of being able to provide guidance on an on-target area lying beyond a certain intersection or the like that is a target for guidance.

In accordance with another aspect of the present invention, there is provided a map information storage medium that stores area information including information about a representative point of each of a plurality of areas lying along roads that intersect at each of a plurality of intersections which are targets for guidance.

As a result, the present invention provides an advantage of being able to easily provide area information including information about a location of each of a plurality of areas lying along roads that intersect at a certain intersection that is a target for guidance.

In accordance with a further aspect of the present invention, there is provided a method including the steps of searching for a route from a current position of a moving object to a destination or via point based on acquired map information, extracting information about an intersection that is located forward of the moving object along the route and that is a target for guidance from the acquired map information, extracting one or more pieces of area information about one or more areas lying along the route and beyond the intersection from the acquired map information, comparing specific information included in each of the one or more pieces of area information with destination information about the destination or via point information about the via point, selecting at least one piece of area information that is to be a target for guidance based on comparison results obtained in the comparison step among from the one or more pieces of area information, and outputting the selected area information.

As a result, the present invention provides an advantage of being able to provide guidance on an on-target area lying beyond a certain intersection or the like that is a target for guidance.

Further objects and advantages of the present invention will be apparent from the following description of the preferred embodiments of the invention as illustrated in the accompanying drawings.

BRIEF DESCRIPTION OF THE DRAWINGS

FIG. 1 is a block diagram showing the structure of a navigation apparatus intended for vehicles according to embodiment 1 of the present invention;

FIG. 2 is a block diagram showing the hardware configuration of the navigation apparatus according to embodiment 1 of the present invention;

FIG. 3 is an explanatory drawing for showing an example of data on areas lying along a route and beyond a certain intersection, which are stored in a map data storage unit of the navigation apparatus of embodiment 1 of the present invention;

FIG. 6 is a flow chart showing operations of a forward intersection detection unit and an area information extracting unit of the navigation apparatus according to embodiment 1 of the present invention;

FIG. 7 is a flow chart showing an operation of an area name determination unit of the navigation apparatus according to embodiment 1 of the present invention;

FIG. 9 is a flow chart showing outputting of a character string and voice data registered by users instead of data on an area lying along a route and a certain intersection, in the navigation apparatus according to embodiment 1 of the present invention.

DETAILED DESCRIPTION OF THE PREFERRED EMBODIMENTS

Figure 4:
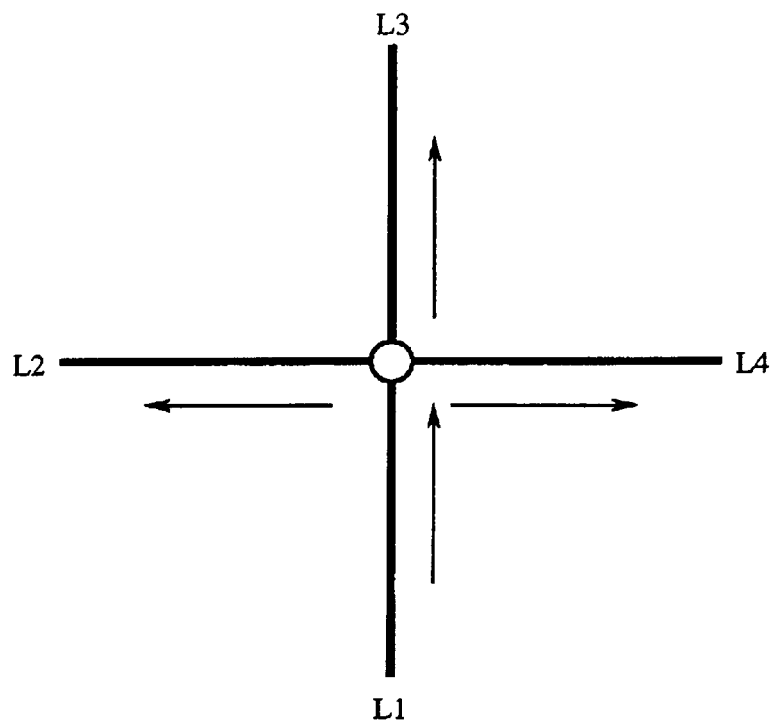
FIG. 4 is an explanatory drawing showing an example of an intersection for explaining an operation of the navigation apparatus according to embodiment 1 of the present invention.

The invention will now be described with reference to the accompanying drawings.

Embodiment 1

FIG. 1 is a block diagram showing the structure of a navigation apparatus intended for vehicles according to embodiment 1 of the present invention. In the figure, reference numeral 9 denotes a map data storage unit for storing map data, such as road information, and data on the names of one or more areas lying beyond each intersection or the like. The map data storage unit 9 is a medium, such as a DVD, for example. Reference numeral 11 denotes a map data acquiring unit (map data acquiring means) for reading map data and name data on the names of one or more areas lying beyond a certain intersection or the like stored in the map data storage unit 9, reference numeral 12 denotes a position determination unit (position determination means) for determining an approximate position of a vehicle equipped with the navigation apparatus from the absolute position of the vehicle acquired by a GPS receiver, an angular velocity measured by a gyro that is a bearing sensor, and vehicle speed pulses acquired by a distance sensor, and for performing map matching based on the map data read from the map data storage unit 9 by the map data acquiring unit 11 and the determined approximate position of the vehicle, reference numeral 13 denotes a route and intersections determination unit (route searching means and intersections extracting means) for determining a recommended route to a destination or via point set by users with reference to the map data storage unit 9, for creating information about intersections on the route that are targets for guidance, and for calculating the distance from each intersection that is a target for guidance, by way of the recommended route, to the destination or via point, and reference numeral 14 denotes a forward intersection detection unit (informed intersection extracting means) for detecting an intersection that is located forward of the vehicle along the route and that is the next target for guidance based on the vehicle position measured by the position determination unit 12 and the information acquired by the route and intersections determination unit 13, and for extracting information about the intersection from the information acquired by the route and intersections determination unit 13.

Reference numeral 15 denotes an area information extracting unit (area information extraction means) for extracting one or more pieces of area information about one or more areas lying along roads outgoing from the detected intersection, to which the vehicle can be headed, each piece of area information including name information about the name of a corresponding area lying along the route and beyond the intersection and additional information (also referred to as area point information from here on), such as the latitude and longitude of a corresponding area, and the distance from the intersection to the corresponding area, from the map information acquired by the forward intersection detection unit 14, reference numeral 16 denotes an area name determination unit (comparison means and selection means) for selecting an on-target area lying along the route and beyond the intersection based on the information extracted by the area information extracting unit 15 and information about the destination, reference numeral 17 denotes a guidance data generation unit (output means) that combines the area lying along the route and beyond the intersection selected by the area name determination unit 16 with information, such as an instruction for making a right turn or left turn, delivered from the forward intersection detection unit 14 so as to create output data on display and voice, reference numeral 18 an input unit/area registration unit (input means) including an input unit via which users are allowed to input information on the latitude and longitude of an arbitrary point, the name of the arbitrary point, voice data, and so on, for registering a variety of information input via the input unit therein, and reference numeral 19 denotes an output unit (output means) for displaying data and outputting sound data by way of a display, a speaker, and so on.

FIG. 2 is a block diagram showing the hardware configuration of the navigation apparatus. In the figure, reference numeral 21 denotes a drive unit for reading map data and data about the names of one or more areas lying along roads outgoing from a certain intersection from a media, such as a DVD, included in the map data storage unit 9 of FIG. 1, the drive unit corresponding to the map data acquiring unit 11 of FIG. 1, reference numeral 22 denotes the GPS receiver that is a sensor for measuring the absolute position thereof and the absolute bearing thereof, reference numeral 23 denotes the gyro for measuring an angular difference when the vehicle makes a turn, reference numeral 24 denotes the vehicle speed sensor for generating vehicle speed pulses every time the vehicle travels by a predetermined distance, and reference numeral 25 denotes an interface circuit for interfacing with a navigation ECU 26 so as to deliver the map data read from the drive unit 21, the absolute position and absolute bearing measured by the GPS receiver 22, the vehicle speed pulse signal acquired by the vehicle speed sensor 24, and the angular velocity acquired by the gyro 23 to the navigation ECU 26.

The navigation ECU 26 controls various computations performed by the navigation apparatus and the whole of the navigation apparatus. The navigation ECU 26 implements various functions including functions performed by the position determination unit 12, the route and intersections determination unit 13, the forward intersection detection unit 14, the area information extracting unit 15, the area name determination unit 16, the guidance data generation unit 17, as shown in FIG. 1, and so on. Reference numeral 28 denotes a display monitor for displaying the names of areas lying along roads outgoing from a certain intersection on a screen thereof, the display monitor corresponding to the output unit 19 of FIG. 1, and reference numeral 29 denotes a speaker for outputting a guidance voice including guidance on the names of areas lying along roads outgoing from a certain intersection, the speaker corresponding to the output unit 19 shown in FIG. 1.

FIG. 3 is an explanatory drawing for showing an example of area information about areas lying along roads outgoing from a detected intersection which is the next target for guidance, the area information being stored in the map data storage unit 9 of the navigation apparatus according to embodiment 1 of the present invention. Every intersection has area information including name information about the names of areas lying along roads outgoing from the intersection itself for each of incoming roads to the intersection itself. The area information further includes location information about the latitude and longitude of a representative point of each of areas lying along roads outgoing from the intersection, distance information about the distance from the intersection, by way of roads, to the representative point of each of the plurality of areas, a distance level indicating a level of either the distance from the intersection, by way of roads, to the representative point of each of the plurality of areas or the straight line distance from the intersection to the representative point of each of the plurality of areas, and so on, which are associated with the name information about the name of each of the plurality of areas.

In addition to the name information, the location information, the distance information and so on, the area information can include time information about either a travel time that the vehicle experiences while traveling from the intersection to each of the plurality of areas or a time of arrival at each of the plurality of areas, bearing information about a bearing angle between the intersection and each of the plurality of areas, and so on.

Next, area information associated with an intersection as shown in FIG. 4 will be explained as an example. When the incoming road to the intersection is a road designated by L1, the number m of outgoing roads is "3" and the area information associated with the incoming road L1 includes the names of areas lying along each of the three outgoing roads (L2, L3, and L4) and the area point information about these areas. In addition, the area information includes information about areas lying along each of all roads connected to either of the three outgoing roads (L2, L3, and L4) outgoing from the intersection. The area information extracting unit 15 shown in FIG. 1 extracts such data associated with the detected intersection that is the next target for guidance from the map data storage unit 9, and delivers the data to the area name determination unit 16.

Figure 5:
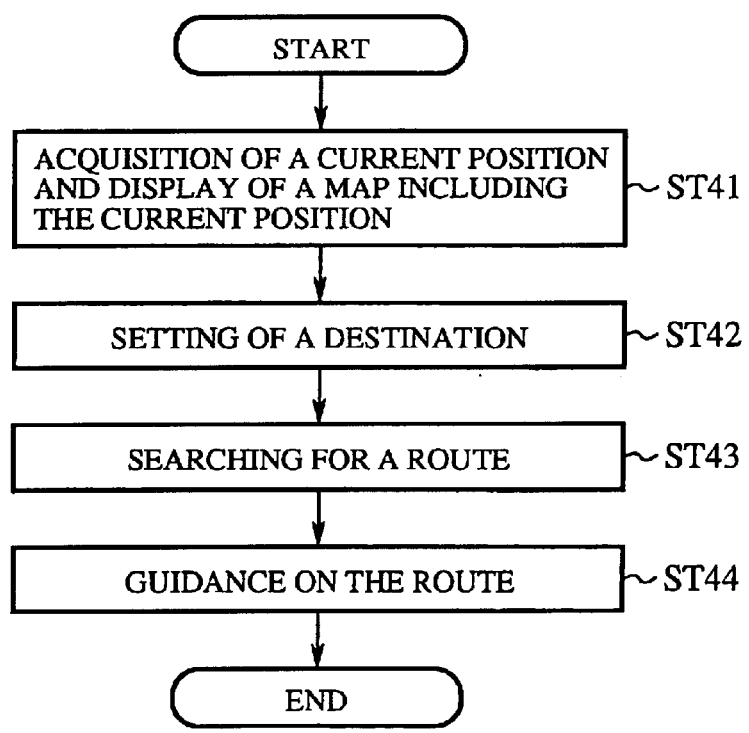
FIG. 5 is a flow chart schematically showing the operation of the navigation apparatus according to embodiment 1 of the present invention.
Figure 8:
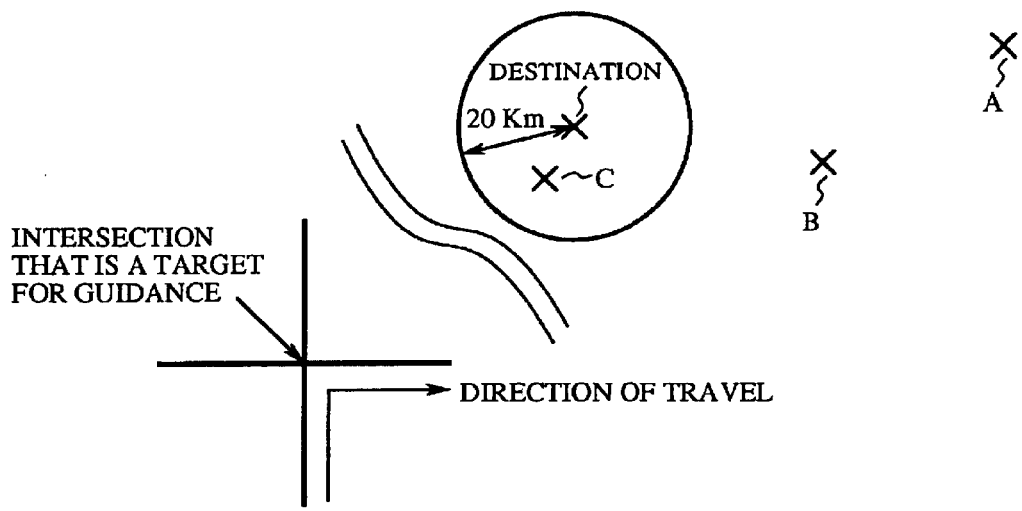
FIG. 8 is an explanatory drawing showing a concrete example of an intersection that is a target for guidance for explaining an operation of the navigation apparatus according to embodiment 1 of the present invention.

Next, a description will be made as to an operation of the navigation apparatus according to the present invention. FIG. 5 is a flow chart schematically showing an operation of this navigation apparatus. FIG. 6 is a detailed flow chart for explaining an operation of the forward intersection detection unit 14 and an operation of the area information extracting unit 15 when the navigation apparatus provides route guidance. FIG. 7 is a detailed flow chart for explaining an operation of the area name determination unit 16, and FIG. 8 is an explanatory drawing for showing an example of an intersection which is detected as the next target for guidance by the navigation apparatus.

First of all, an operation of this navigation apparatus will be briefly explained with reference to the flow chart of FIG. 5. When the navigation apparatus is started, the navigation apparatus reads map data about an area in the vicinity of the current position of the vehicle from the map data storage unit 9 based on the current position of the vehicle acquired by the position determination unit 12 by using the map data acquiring unit 11, and displays a map of the area in the vicinity of the current position of the vehicle (in step ST41). The navigation apparatus then allows users to set a destination by using the name of an area, the name of a facility, a telephone number, an address, a registered point, or the like (in step ST42). In this case, the navigation apparatus stores the character string of the name of a place, a facility, or the like, which is set as the destination by users therein. The route and intersections determination unit 13 then starts to search for a route to the destination, and determines intersections which can be targets for guidance based on the searched route (in step ST43). The navigation apparatus repeats guidance on the route to the destination while keeping track of the current position of the vehicle by using the position determination unit 12 (in step ST44).

Next, an operation of the forward intersection detection unit 14 and an operation of the area information extracting unit 15 will be explained with reference to the flow chart shown in FIG. 6. First of all, the forward intersection detection unit 14 identifies where the vehicle whose position is determined by the position determination unit 12 is on the route determined by the route and guidance intersection calculation unit 13, and searches through the route in a forward direction extending from the identified position of the vehicle for an intersection that is a next target for guidance (in step ST501). When the forward intersection detection unit 14 finds an intersection that is the next target for guidance, the navigation apparatus advances to the next step in which the area information extracting unit 15 determines whether the found intersection, which is the next target for guidance, has data about areas lying along the route and beyond the intersection (in step ST502). When the found intersection has data about only one area lying along the route and beyond the intersection, the area information extracting unit 15 advances to the next step in which the area information extracting unit 15 extracts the name of the area lying along the route and beyond the intersection and the additional information (i.e., area point information) about the area (in step ST503). The area point information includes information about the location information about the latitude and longitude of a representative point (for example, city office) of the area lying along the route and beyond the intersection, the distance information about the shortest distance from the intersection, by way of roads, to the representative point of the area lying along the route and beyond the intersection, and a distance level indicating a level of either the shortest distance from the intersection, by way of roads, to the representative point of the area lying along the route and beyond the intersection or the straight line distance from the intersection to the representative point of the area lying along the route and beyond the intersection. The shortest distance from any intersection, by way of roads, to a representative point of an area lying along the route and beyond the intersection can be classified into one of N levels. For example, in the case of N=3, level 1 shows a distance that is equal to or greater than 0 km and is less than 30 km, level 2 shows a distance that is equal to or greater than 30 km and is less than 100 km, and level 3 shows a distance that is equal to or greater than 100 km. When the intersection, which is the next target for guidance, has data on the names of a plurality of areas lying along the route and beyond the intersection, the area information extracting unit 15 extracts the names of all the areas and the area point information about all the areas.

Next, an operation of the area name determination unit 16 will be explained with reference to the flow chart shown in FIG. 7. First of all, the area name determination unit 16 compares the character string of each of one or more areas lying along the route and beyond the intersection, which are extracted by the area information extracting unit 15 in step ST601, with the character string of the name of the destination acquired by the route and intersections determination unit 13. When determining that the intersection has one or more areas lying along the route and beyond the intersection and each having a character string that partially or totally matches up with the character string of the name of the destination, the area name determination unit 16 advances to step ST602 in which the area name determination unit 16 selects one area with the largest degree of match from the one or more areas lying along the route and beyond the intersection and then advances to step ST610. In contrast, when the intersection has no area lying along the route and beyond the intersection and having a character string that partially or totally matches up with the character string of the name of the destination, the area name determination unit 16 advances to step ST603.

In step ST603, the area name determination unit 16 determines the straight line distance from each of the one or more areas lying along the route and beyond the intersection, which are extracted by the area information extracting unit 15, to the destination based on the latitude and longitude of the representative point of each of the one or more areas lying along the route and beyond the intersection and the latitude and longitude of the destination. When determining that the intersection has one or more areas lying along the route and beyond the intersection whose straight line distance to the destination is equal to or less than a threshold value (for example, 10 km), the area name determination unit 16 advances to step ST604 in which the area name determination unit 16 selects one area with the shortest straight line distance from the one or more areas lying along the guided route and advances to step ST610. The threshold value can be kept constant at all times. As an alternative, the threshold value can be varied according to the distance from the vehicle position to the destination. When determining, in step ST603, that the intersection has no area lying along the route and beyond the intersection whose straight line distance to the destination is equal to or less than the threshold value, the area name determination unit 16 advances to step ST605.

In step ST605, the area name determination unit 16 determines the absolute value (simply referred as distance difference from here on) of a difference between the shortest distance from the intersection determined by the route and intersections determination unit 13, by way of roads, to each of the one or more areas lying along the route and beyond the intersection, which are extracted by the area information extracting unit 15, and the distance from the intersection to the destination, and, when determining that the intersection has one or more areas lying along the route and beyond the intersection and having a distance difference which is equal to or less than a threshold value (for example, 20 km), advances to step ST606 in which the area name determination unit 16 selects an area with the shortest distance difference from the one or more areas lying along the route and beyond the intersection and advances to step ST610. The threshold value can be kept constant at all times. As an alternative, the threshold value can be varied according to the distance from the vehicle position to the destination. When determining, in step ST605, that the intersection has no area lying along the route and beyond the intersection and having a distance difference which is equal to or less than the threshold value, the area name determination unit 16 advances to step ST607.

In step ST607, the area name determination unit 16 determines the absolute value (simply referred as straight line distance difference from here on) of a difference between the straight line distance from the intersection to each of the one or more areas lying along the route and beyond the intersection and the straight line distance from the intersection to the destination, and the absolute value (simply referred as bearing difference from here on) of a difference between the bearing angle between the intersection and each of the one or more areas lying along the route and beyond the intersection and the bearing angle between the intersection and the destination. When determining that the intersection has one or more areas lying along the route and beyond the intersection and having a straight line distance difference which is equal to or less than a threshold value (for example, 20 km) and a bearing difference which is equal to or less than another threshold value, the area name determination unit 16 advances to step ST608 in which the area name determination unit 16 selects an area with the smallest straight distance difference and the smallest bearing difference from the one or more areas lying along the route and beyond the intersection and advances to step ST610. Those threshold values can be kept constant at all times. As an alternative, the threshold values can be varied according to the distance from the vehicle position to the destination. When determining, in step ST607, that the intersection has no area lying along the route and beyond the intersection and having a straight line distance difference which is equal to or less than the corresponding threshold value and a bearing difference which is equal to or less than the corresponding threshold value, the area name determination unit 16 advances to step ST609.

In step ST609, the area name determination unit 16 compares the distance level of each of the one or more areas lying along the route and beyond the intersection with the distance level of the destination, selects an area having a distance level that is the closest to that of the destination from the one or more areas lying along the guided route, and then advances to step ST610. When determining that the intersection has two or more areas lying along the route and beyond the intersection and having a distance level that is the closest to that of the destination, the area name determination unit 16 selects an area whose name is registered at a position that is the closest to the head of the map data storage unit 9 from among the two or more areas having the distance level. The distance level of the destination is determined based on the distance from the intersection that is the next target for guidance to the destination, which is determined by the route and intersections determination unit 13, and is selected from among a plurality of levels provided in advance (for example, level 1 showing a distance that is equal to or greater than 0 km and is less than 30 km, level 2 showing a distance that is equal to or greater than 30 km and is less than 100 km, and level 3 showing a distance that is equal to or greater than 100 km, which are defined as distance levels into which data about areas lying along each intersection, which are stored in the map data storage unit 9, are classified).

In step ST610, the area name determination unit 16 sends name data on the name of the selected area lying along the route and beyond the intersection to the guidance data generation unit 17. The guidance data generation unit 17 generates guidance data on display and voice and sends the guidance data to the output unit 19.

For example, assume that the area information extracting unit 15 extracts name data on the names of three areas A, B, and C lying along the route and beyond the intersection as shown in FIG. 8 which is the next target for guidance. The area name determination unit 16 determines the straight line distances between the three areas A, B, and C lying along the route and beyond the intersection and the destination, respectively, from the latitude and longitude of the representative point of each of the plurality of areas and the latitude and longitude of the destination X. Assuming that they are 200 km, 80 km, and 10 km, the area name determination unit 16 selects C when it is assumed that the threshold value in step ST603 is 20 km and the guidance data generation unit 17 generates guidance data on the name of the area C. For example, the guidance data generation unit 17 generates voice guidance such as "Please advance to C district".

If the area A is selected as the target area lying along the route and beyond the intersection and guidance on the area is generated, there is a possibility that the driver has confusion because the area is too far away from the destination. In contrast, in accordance with this embodiment, the navigation apparatus can provide optimum guidance for the driver by selecting an area lying along the route and beyond the intersection that is the nearest to the destination.

In the above explanation, it is assumed that the destination is the one set by users, or when a via point on the way to the destination is set by users, the destination indicates the via point to which the vehicle is headed.

As previously explained, in accordance with this embodiment, the area name determination unit 16 selects the name of an area lying along the route and beyond a detected intersection, which is to be delivered to the guidance data generation unit 17, based on the name data and area information about areas lying along the route and beyond the detected intersection extracted from the map data storage unit 9 and the information about the destination. As an alternative, the input unit/area registration unit 1 can have a function of registering information about the latitude and longitude of an arbitrary point, the character string of the name of the arbitrary point, and audio data on the arbitrary point, which are input by users. In accordance with this variant, as shown in steps ST701 and ST702 of a flow chart of FIG. 9, when the distance between the destination and the arbitrary point registered by users through the input unit/area registration unit 18 is equal to or less than a threshold value (for example, 10 km), which is determined from the latitude and longitude of the arbitrary point and the latitude and longitude of the destination, the area name determination unit 16 sends the character string of the name of the arbitrary point and voice data registered by users instead of data on areas lying along the route and beyond a detected intersection to the guidance data generation unit 17 as determination results, so that the guidance data generation unit 17 can generate and deliver guidance data on the arbitrary point to the output unit 19. In this case, the navigation apparatus can provide guidance such as "The vehicle is traveling in a direction to your company". In other words, the navigation apparatus can provide guidance that is easier for the driver to understand.

Numerous variants can be made in the above-mentioned exemplary embodiment.

As previously mentioned with reference to the flow charts shown in FIGS. 6 and 7, the navigation apparatus according to this embodiment selects one area from among a plurality of areas lying along the route and beyond a detected intersection that is a next target for guidance by using the latitude and longitude of a representative point (for example, city office) of each of the plurality of areas, either the shortest distance or the straight line distance from the detected intersection to the representative point of each of the plurality of areas, the destination or the via point, a distance level indicating a level of the shortest distance or the straight line distance from the detected intersection to the representative point of each of the plurality of areas, the destination or the via point, or the bearing angle between the intersection and the representative point of each of the plurality of areas, the destination or the via point. As an alternative, the navigation apparatus can use time information about either a travel time that the vehicle experiences while traveling from the detected intersection to the representative point of each of the plurality of areas, the destination or the via point or a time of arrival at the representative point of each of the plurality of areas, the destination or the via point, instead of the shortest distance or the straight line distance, the bearing angle, or the like. Because a vehicle speed and an average vehicle speed can be determined by measuring the vehicle speed at predetermined intervals and calculating an average of the measured values of the vehicle speed, either a time required for the vehicle to travel from the detected intersection to the representative point of each of the plurality of areas, the destination or the via point or the time of arrival at the representative point of each of the plurality of areas, the destination or the via point can be easily determined.

In accordance with another variant, in step ST607, the area name determination unit 16 determines either a straight line distance difference between the straight line distance from the intersection to each of the one or more areas lying along the route and beyond the intersection and the straight line distance from the intersection to the destination, or a bearing difference between the bearing angle between the intersection and each of the one or more areas lying along the route and beyond the intersection and the bearing angle between the intersection and the destination. When determining that the intersection has one or more areas lying along the route and beyond the intersection and having either a straight line distance difference which is equal to or less than a threshold value (for example, 20 km) or a bearing difference which is equal to or less than another threshold value, the area name determination unit 16 advances to step ST608 in which the area name determination unit 16 selects an area with either the smallest straight distance difference or the smallest bearing difference from the one or more areas lying along the route and beyond the intersection and advances to step ST610. When determining, in step ST607, that the intersection has no area lying along the route and beyond the intersection and having either a straight line distance difference which is equal to or less than the corresponding threshold value or a bearing difference which is equal to or less than the corresponding threshold value, the area name determination unit 16 advances to step ST609.

In accordance with a further variant, the area name determination unit 16 can select two or more areas lying along the route and beyond a detected intersection which satisfy a certain condition instead of selecting only one area lying along the route and beyond the detected intersection, in step ST602, ST604, ST606, ST608, or ST609 of FIG. 7. In this case, the area name determination unit 16 sends name data on the names of the selected two or more areas lying along the route and beyond a detected intersection to the guidance data generation unit 17, and the guidance data generation unit 17 delivers area information about an area with the shortest distance from the intersection or the shortest travel time that the vehicle experiences while traveling from the intersection to the area to the output unit 19. Needless to say, the guidance data generation unit 17 can alternatively generate guidance data on all areas selected by the area name determination unit 16 and deliver the guidance data to the output unit 19.

When the area name determination unit 16 determines that either the distance between the current position of the vehicle and the intersection that is the next target for guidance or the time required for the vehicle to travel from the current position to the intersection is less than a threshold value, the area name determination unit 16 outputs information about the intersection including the area information about the selected area to the guidance data generation unit 17 according to the flow chart of FIG. 7.

Many widely different embodiments of the present invention may be constructed without departing from the spirit and scope of the present invention. It should be understood that the present invention is not limited to the specific embodiments described in the specification, except as defined in the appended claims.

What is claimed is:

1. A navigation apparatus wherein said apparatus comprises:
   a map information acquiring means for acquiring map information;
   a position determination means for determining a current position of a moving object;
   an input means for inputting a destination or via point;
   a route searching means for searching for a route from the current position of the moving object to the destination or via point based on the map information acquired by said map information acquiring means;
   an intersection extraction means for extracting information about an intersection that is located forward of the moving object along the route and that is a target for guidance from the acquired map information;
   an area information extraction means for extracting one or more pieces of area information about one or more areas lying along the route and beyond the intersection from the acquired map information;
   a comparison means for comparing specific information included in each of the plurality of pieces of area information with either destination information about the destination or via point information about the via point;
   a selection means for selecting at least one piece of area information that is to be a target for guidance based on comparison results obtained by said comparison means among from the one or more pieces of area information; and
   an output means for outputting the selected area information.

2. The navigation apparatus according to claim 1, wherein said comparison means compares the specific information included in each of the plurality of pieces of area information with either the destination information or the via point information so as to determine a degree of match between them, and said selection means selects one piece of area information according to the degree of match determined by said comparison means.

3. The navigation apparatus according to claim 2, wherein each of the one or more pieces of area information includes either one of name information about a name of each of the one or more areas lying along the route and beyond the intersection, location information about a location of each of the one or more areas lying along the route and beyond the intersection, distance information about a distance from the intersection to each of the one or more areas lying along the route and beyond the intersection, time information about either a travel time that the moving object experiences while traveling from the intersection to each of the one or more areas lying along the route and beyond the intersection or a time of arrival at each of the one or more areas lying along the route and beyond the intersection, and bearing information about a bearing angle between the intersection and each of the one or more areas lying along the route and beyond the intersection, as the specific information that is compared with the destination information or the via point information by said comparison means.

4. The navigation apparatus according to claim 3, wherein said comparison means compares a character string of the name of each of the one or more areas lying along the route and beyond the intersection, which is specified by the name information, with a character string of a name of the destination or via point so as to determine a degree of match between those character strings, and said selection means selects at least one piece of area information about an area having a degree of match determined by said comparison means which is equal to or greater than a predetermined value from among the one or more pieces of area information.

5. The navigation apparatus according to claim 3, wherein said comparison means compares the location information about each of the one or more areas lying along the route and beyond the intersection with location information about a location of the destination or via point so as to determine a degree of match between those pieces of location information, and said selection means selects at least one piece of area information about an area lying along the route and beyond the intersection and having a degree of match determined by said comparison means which is equal to or greater than a predetermined value from among the one or more pieces of area information.

6. The navigation apparatus according to claim 5, wherein said comparison means determines a straight line distance between the location of each of the one or more areas lying along the route and beyond the intersection, which is specified by the location information, and the destination or via point, and said selection means selects at least one piece of area information about an area lying along the route and beyond the intersection and having a straight line distance determined by said comparison means which is equal to or less than a predetermined value from among the one or more pieces of area information.

7. The navigation apparatus according to claim 3, wherein said comparison means compares the distance information about each of the one or more areas lying along the route and beyond the intersection with distance information about a distance from the intersection to the destination or via point so as to determine a degree of match between those pieces of distance information, and said selection means selects at least one piece of area information about an area lying along the route and beyond the intersection and having a degree of match determined by said comparison means which is equal to or greater than a predetermined value from among the one or more pieces of area information.

8. The navigation apparatus according to claim 7, wherein said comparison means determines, as the degree of match, a difference between a distance from the intersection, by way of roads, to each of the one or more areas lying along the route and beyond the intersection and a distance from the intersection, by way of roads, to the destination or via point, and said selection means selects at least one piece of area information about an area lying along the route and beyond the intersection and having a difference determined by said comparison means whose absolute value is equal to or less than a predetermined value from among the one or more pieces of area information.

9. The navigation apparatus according to claim 3, wherein said comparison means compares the time information about each of the one or more areas lying along the route and beyond the intersection with time information about either a travel time that the moving object experiences while traveling from the intersection to the destination or via point or a time of arrival at the destination or via point so as to determine a degree of match between those pieces of time information, and said selection means selects at least one piece of area information about an area lying along the route and beyond the intersection and having a degree of match determined by said comparison means which is equal to or greater than a predetermined value from the plurality of pieces of area information.

10. The navigation apparatus according to claim 3, wherein said comparison means compares the bearing information about each of the one or more areas lying along the route and beyond the intersection with bearing information about a bearing angle between the intersection and the destination or via point so as to determine a degree of match between those pieces of bearing information, and said selection means selects at least one piece of area information about an area lying along the route and beyond the intersection and having a degree of match determined by said comparison means which is equal to or greater than a predetermined value from among the one or more pieces of area information.

11. The navigation apparatus according to claim 1, wherein when said selection means selects two or more pieces of area information, said output means outputs only one piece of area information about an area having a shortest distance from the intersection or a shortest travel time that the moving object experiences while traveling from the intersection.

12. The navigation apparatus according to claim 1, wherein when said comparison means determines that either a distance between the current position of the moving object and the intersection or a travel time that the moving object experiences while traveling from the current position to the intersection is equal or less than a predetermined value, said output means outputs information about the intersection including the selected area information.

13. The navigation apparatus according to claim 12, wherein said output means outputs the selected area information by voice.

14. The navigation apparatus according to claim 1, wherein said input means inputs area information which can be extracted by said area information extraction means.

15. A map information storage medium wherein said medium stores area information including guidance information about a representative point of each of a plurality of areas lying along roads that intersect a route at each of a plurality of intersections, wherein the plurality of areas lying along the roads that intersect the route are targets for guidance, wherein the area information includes name information about a name of each of the one or more areas lying along the route and beyond the corresponding intersection, and wherein the area intersection further includes at least one of location information about a location of each of the one or more areas lying along the route and beyond the corresponding intersection, distance information about a distance from the intersection to each of the one or more areas lying alone the route and beyond the corresponding intersection, time information about either a travel time that the moving object experiences while traveling from the intersection to each of the one or more areas lying along the route and beyond the corresponding intersection or a time of arrival at each of the one or more areas lying along the route and beyond the corresponding intersection, and bearing information about a bearing angle between the intersection and each of the one or more areas lying along the route and beyond the corresponding intersection.

16. A method of providing information about areas lying beyond a certain intersection for users, wherein said method comprises the steps of:

acquiring map information; determining a current position of a moving object;

inputting a destination or via point; searching for a route from the current position of the moving object to the destination or via point based on the acquired map information;

extracting information about an intersection that is located forward of the moving object along the route and that is a target for guidance from the acquired map information;

extracting one or more pieces of area information about one or more areas lying along the route and beyond the intersection from the acquired map information;

comparing specific information included in each of the plurality of pieces of area information with destination information about the destination or via point information about the via point;

selecting at least one piece of area information that is to be a target for guidance based on comparison results obtained in said comparison step among from the one or more pieces of area information; and outputting the selected area information.

* * * * *